United States Patent [19]

Saito

[11] Patent Number: 4,644,466
[45] Date of Patent: Feb. 17, 1987

[54] PIPELINE PROCESSOR

[75] Inventor: Koji Saito, Tokyo, Japan

[73] Assignee: NEC Corporation, Tokyo, Japan

[21] Appl. No.: 678,039

[22] Filed: Dec. 4, 1984

[30] Foreign Application Priority Data

Dec. 5, 1983 [JP] Japan .............................. 58-229520

[51] Int. Cl.$^4$ .............................................. G06F 9/38
[52] U.S. Cl. .................................................... 364/200
[58] Field of Search ... 364/200 MS File, 900 MS File

[56] References Cited

U.S. PATENT DOCUMENTS 4,454,578 6/1984 Matsumoto et al. ................ 364/200
4,476,525 10/1984 Ishii ..................................... 364/200

Primary Examiner—Raulfe B. Zache
Attorney, Agent, or Firm—Schwartz, Jeffery, Schwaab, Mack, Blumenthal & Evans

[57] ABSTRACT

A pipeline processor has a plurality of operand registers, a pipelined arithmetic unit, and a plurality of data buses connected between outputs of operational stages of the arithmetic unit and the inputs of the arithmetic unit. A selector is provided for selecting either outputs of the plurality of operand registers or outputs of the operational stages of the arithmetic unit as inputs to the arithmetic unit. The processor further includes a generator for generating operand determination signals indicating that an output of the plurality of operational stages of the arithmetic unit has been determined as write-in data for an operand register corresponding to a stage of the arithmetic unit and a circuit for transmitting and circulating a register number given for the operand register whose renewal is specified by a given instruction. The processor further includes a control circuit responsive to at least the register number and operand determination signal for controlling the selector so as to select at least one of the operand registers when at least one operand for the instruction is held in the at least one operand register. The selector selects the arithmetic unit when the operand for the instruction has already been determined in the arithmetic unit and selects the arithmetic unit after the operand for the instruction has been determined, unless the operand for the instruction is determined such that the operand is supplied to the arithmetic unit.

1 Claim, 5 Drawing Figures

PIPELINE PROCESSOR

BACKGROUND OF THE INVENTION

This invention relates to a processor for accomplishing bypass control of operands and determination-awaiting control of operands in a data processing (DP) system.

A conventional processor having pipeline-controlled execution stages has a fixed number of operational stages. Accordingly, in some types of operation, the result of the operation may be determined at a stage prior to the final operation stage. However, since the number of stages of the processing pipe is fixed, there is a disadvantage that the earlier determined result of operation cannot be used as the operand of the next operation until the final operation stage.

Meanwhile, there is proposed in U.S. Pat. No. 4,476,525 filed by the same assignee on Aug. 14, 1981, a system by which the write-in stage of an operational instruction is overlapped with that of the following storage instruction so that the time taken for the execution of the following storage instruction can be virtually reduced to "0".

This system, however, has a disadvantage that where an operational instruction and a storage instruction are combined and the two instructions are consecutive, a processor whose processing pipes have multiple stages can have no substantial advantage.

SUMMARY OF THE INVENTION

An object of the present invention is to eliminate the above-mentioned disadvantages and provide a processor having a high throughput.

According to the invention, there is provided a processor for executing operations in a pipeline system, comprising:

a group of operand registers further having a plurality of registers, each identified by a register number;

a pipelined arithmetic unit having a plurality of operational stages;

a plurality of data buses for giving as operand inputs outputs of a plurality of operational stages of the arithmetic unit to the arithmetic unit;

a selector circuit for selecting either an output from the group of operand registers or that of the arithmetic unit;

a generator for generating an operand determination signal indicating that an output from said plurality of operational stages of the arithmetic unit has been determined as write-in data for an operand register corresponding to a stage of the arithmetic unit;

a circuit for transmitting and circulating a reference number given for said operand register whose renewal is specified by a given instruction, and a command to renew the operand register corresponding to said stage of the arithmetic unit; and a control circuit for so effecting control, when in the arithmetic unit, another instruction whose operands are the contents of one of said group of operand registers is executed, as either to selectively give said group of operand registers or the data buses or, if said operands are not yet determined, to wait for the start of operation and to start operation as soon as said operands are determined by an operand register number designated by said another instruction, an operand determination signal corresponding to said operand stage of the arithmetic unit, a register number for designating said operand register to be renewed and for serving as operands for the group of operand registers, and a command to renew the contents of the operand register corresponding to the stage of the arithmetic unit.

BRIEF DESCRIPTION OF THE DRAWINGS

Other features of the present invention will be more apparent from the detailed description hereunder when taken in conjunction with the accompanying drawings, wherein.

In these figures, the same reference numerals represent respectively the same constituent elements.

DETAILED DESCRIPTION OF THE PREFERRED EMBODIMENTS

Figure 1:
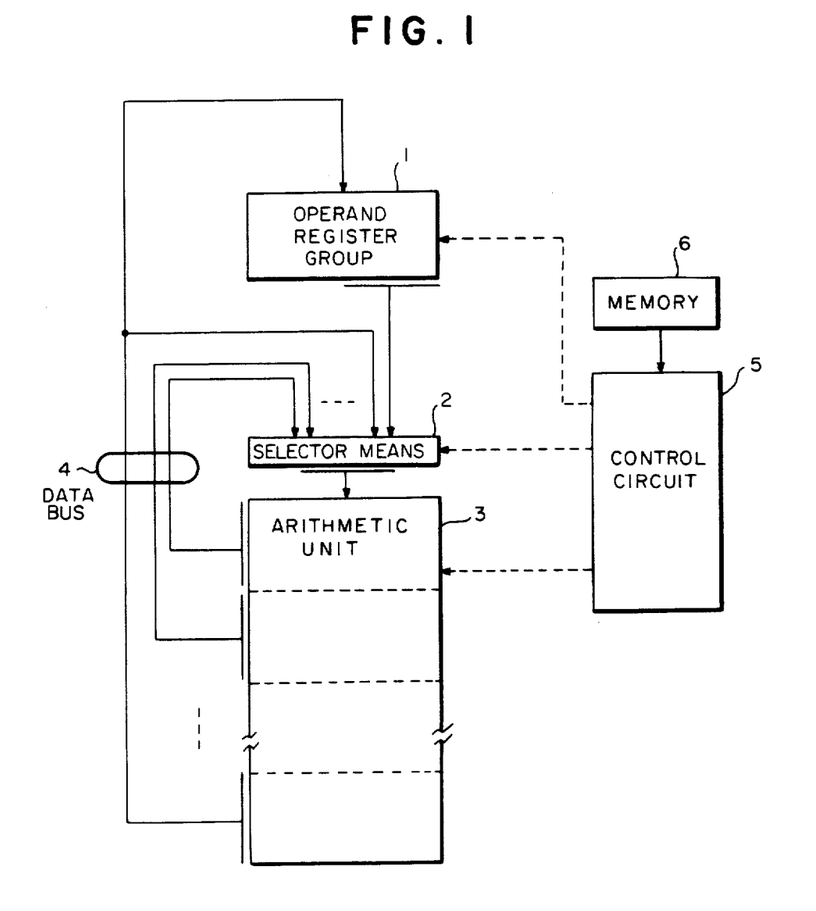
FIG. 1 illustrates one embodiment of the invention.

Referring to FIG. 1, one embodiment of the present invention has a data section and a control section. The data section further has an operand register group 1, an arithmetic unit 3 comprising a plurality of operational stages; a data bus 4 for supplying the arithmetic output of the plurality of operational stages to the arithmetic unit 3 as operands, and selector means 2 for connecting the output data of the operand register group 1 with the arithmetic unit 3.

The control section is composed of a control circuit 5 and a memory 6.

Figure 2:
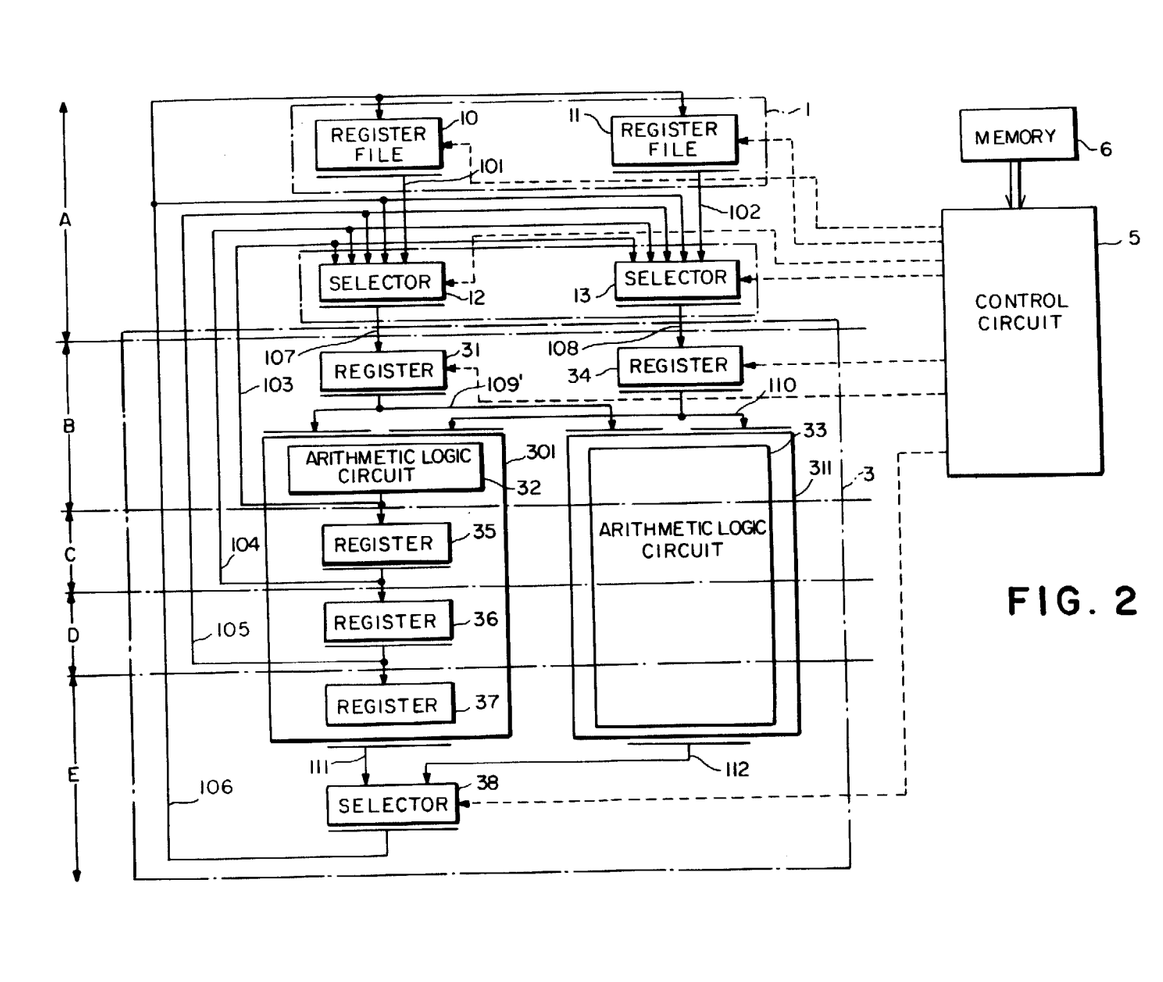
FIG. 2 shows the data line of one embodiment of the invention.

The depth (number of stages) of the processing pipes of the processor is not specified, but for the convenience of description it is supposed to be five stages herein, denominated as stage A, stage B, stage C, stage D and stage E from the first to fifth stages, respectively. Two processing pipes are provided in parallel. A plurality of register files 100 and 11 for storing operands, each composed in a register file form, permit an operand to be written into any desired register in response to a write-in number and a renewal command and reading out of any desired register in response to a read-out number. A read-out number is given to the register file 10 by a register 521 in FIG. 3, and the register file 11 is given a read-out number by a register 522 in FIG. 3. The register file 10 is for storing a first operand, and the register file 11, for a second operand. Both are register groups of stage A. A selector 12 selects the first operand for an operation by switching among the output signals of the register file 10, a first arithmetic logic circuit 32, a register 35, another register 36 and another selector 38. The selector 12 is connected to the register file 10, the first arithmetic and logic circuit 32, registers 35 and 36, and the selector 38 by signal lines 101, 103, 104, 105 and 106, respectively. A selector 13 switches among the output signals of the register file 11, the first arithmetic and logic circuit 32, the registers 35 and 36, and the selector 38, and selects the second operand for the operation. The selector 13 is connected to the register file 11, the first arithmetic and logic circuit 32, registers 35 and 36, and the selector 38 by signal lines 102, 103, 104, 105 and 106, respectively.

A register 31 is on stage B and, in response to the first operand selected by the selector 12, supplies the operand to the processing pipes. This register 31 is connected to the selector 12 by a signal line 107.

A register 34 is on stage B and, in response to the second operand selected by the selector 13, supplies the operand to the processing pipes. This register 34 is connected to the selector 13 by a signal line 108.

A first processing pipe 301 consists of the arithmetic logic circuit 32 whose operational result is determined only at stage B, the register 35 of stage C, the register 36 of stage D and the register 37 of stage E. The first arithmetic logic circuit 32 receives the supply of operands from the registers 31 and 34 by way of signal lines 109 and 110, respectively. The first processing pipe 301, having four stages (B, C, D and E), is so structured that the operational results can be bypassed from the individual stages via the signal lines 103, 104, 105 and 106. The depth of this pipe is matched with that of a second processing pipe.

The second processing pipe 311, composed of an arithmetic logic circuit 33, occupies four stages, B, C, D and E. The second arithmetic logic circuit 33 receives the supply of operands from the registers 31 and 34 via the signal lines 109 and 110, respectively, and the operational results are determined at stage E.

The selector 38 is connected to the first processing pipe 301 and the second processing pipe 311 by signal lines 111 and 112, respectively, and switches between the operational results of these pipes 301 and 311. The output signals of the selector 38 are connected to the register files 10 and 11 by the signal line 106. The write-in numbers of the register files 10 and 11 are commonly provided by a resister 561 of the stage E, shown in FIG. 3, and upon the renewal command corresponding to bit 1 of a register 560 in FIG. 3, the operational results are stored into the register files 10 and 11.

Figure 3:
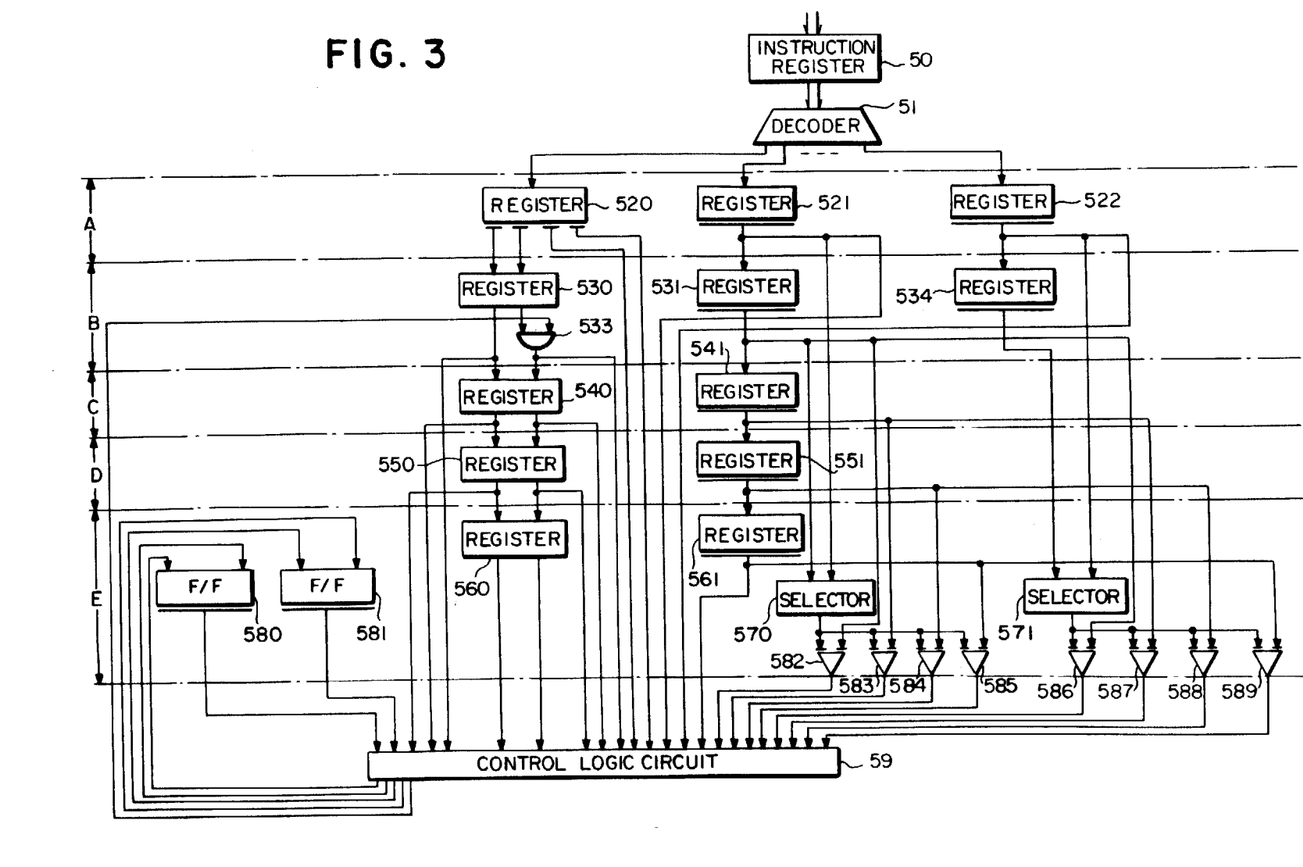
FIG. 3 illustrates the control line, for effecting bypass control and operand determination-awaiting control, of one embodiment of the invention.

Referring now to FIG. 3, the control circuit for effecting the bypass control of operands and determination-awaiting control of operands will be described in detail below.

The control circuit 5 is made up of an instruction register 50, a decoder 51, registers 520, 521, 522, 530, 531, 534, 540, 541, 550, 551, 560 and 561, selectors 570 and 571, flip-flops (F/Fs) 580 and 581, comparators 582, 583, 584, 585, 586, 587, 588 and 589, and a control logic circuit 59.

In the register 520, which is at stage A, are stored bypass control information for executial instructions and determination-awaiting information for operands.

In the register 521 is stored the register number for the first operand, together with a renewed register number.

In the register 522 is stored the register number for the second operand.

Both the registers 521 and 522 are at stage A, and the register number of each is supplied from the decoder 51.

The registers 530, 540, 550 and 560 are arranged at stages B, C, D and E, respectively, to circulate part of the control information of the register 520 from one stage to another of the processing pipes.

The registers 531, 541, 551 and 561 are arranged at stages B, C, D and E, respectively, to circulate the contents of the register 521 (renewed register numbers) from one stage to another of the processing pipes.

The selector 570 is used for switching the register number for the register 521's first operand, which is stored in the register 531 when the waiting for the first operand determination is generated. At this time, the register 531 serves as the slide buffer for the register 521.

The selector 571 is used for switching the register number for the register 522's second operand, which is stored in the register 534 when the waiting for the second operand determination is generated. At this time, the register 534 serves as the slide buffer for the register 522.

The comparators 582, 583, 584 and 585 are intended for preparing the bypass control information for the first operand and determination-awaiting control information for operands. The comparator 582 compares the output of the selector 570 and that of the register 531; the comparator 583, the output of the selector 570 and that of the register 541; the comparator 584, the output of the selector 570 and that of the register 551, and the comparator 585, the output of the selector 570 with that of the register 561, and they are so connected as to be able to detect any identity between those values.

The comparators 586, 587, 588 and 589 are intended for preparing the bypass control information for the second operand and determination-awaiting control information for operands. The comparator 586 compares the output of the selector 571 and that of the register 531; the comparator 587, the output of the selector 571 and that of the register 541; the comparator 588, the output of the selector 571 and that of the register 551, and the comparator 589, the output of the selector 571 with that of the register 561, and they are so connected as to be able to detect any identity between those values.

The output of the F/F 580 indicates the determination-awaiting state of the first operand, and that of the F/F 581, that of the second operand. The output signals of the F/Fs 580 and 581 are used for the determination-awaiting control of the operands and hold control for the registers of stages A and B.

The control logic circuit 59 collectively indicates the logic of bypass control and determination-awaiting control of operands, and the logic will be successively shown below in the form of logical expressions.

Next will be described the bypass control and determination-awaiting control of operands which the execution of an instruction entails.

Suppose that an instruction to be executed, coming from an external unit, is stored in the register 50 and decoded by the decoder 51, and that the decoded result is stored in each register of stage A.

When the instruction is going to shift from stage A to stage B, if another instruction to renew the first operand register or the second operand register to be used by the instruction is present at a stage of pipe ahead of the instruction (stage B, C, D or E) and the operational result can be bypassed, i.e. occupies the first processing pipe or is present at stage E of the second processing pipe, bypass control will be achieved by switching the selectors 12 and 13. If the operational result cannot be bypassed, that is, occupies the second processing pipe and is absent at stage E, operand determination-awaiting flags are set in the F/Fs 580 and 581 (independently for the first and second operands), and the registers of stages A and B are placed in a hold state. As the operational result is determined, in a state of operand determination awaiting at stage E of the second processing pipe, this operation result, or the operands of an instruction representing an operand determination-awaiting state, are supplied to the registers 31 and 34, and at the same time the operand determination-awaiting state is discontinued by resetting the operand determination-awaiting flags with respect to the F/Fs 580 and 581.

Next, referring to FIG. 4, bypass control and determination-awaiting control of operands will be described in the form of logical expression. Signals for the individual bits of control registers are named sequentially.

Stage A
520  521  522
[0 1 2 3] [ ] [ ]

520 Bit 0 → VP1A 0: The second processing pipe is used.
              1: The first processing pipe is used.
520 Bit 1 → RW A 0: Register groups 10 and 11 are not renewed.
              1: Register groups 10 and 11 are renewed.
520 Bit 2 → RR1 0: Register contents are not used for the first operand.
              1: Register contents are used for the first operand
520 Bit 3 → RR2 0: Register contents are not used for the second operand.
              1: Register contents are used for the second operand.
521 → RN1A Register number for the first operand or a renewed register number.
522 → RN2A Register number for the second operand.

Stage B
530  531  534  580  581
[0|1] [ ] [ ] [ ] [ ]

530 Bit 0 → VP1B Stage B of the first processing pipe is occupied.
530 Bit 1 → RW3 Renewal of the stage B registers is instructed.
531 → RN1B The first register number of stage B.
534 → RN2B The second register number of stage B.
580 → RB1 Determination of the first operand is awaited.
581 → RB2 Determination of the second operand is awaited.

Stage C
540  541
[0|1] [ ]

540 Bit 0 → VP1C Stage C of the first processing pipe is occupied.
540 Bit 1 → RWC Renewal of the stage C registers is instructed.
541 → RNC Renewed register numbers of stage C.

Stage D
550  551
[ ] [ ]

550 Bit 0 → VP1D Stage D of the first processing pipe is occupied.
550 Bit 1 → RWD Renewal of the stage D registers is instructed.
551 → RND Renewed register numbers of stage D.

Stage E
560  561
[ ] [ ]

560 Bit 0 → VP1E Selection by the selector 38 is instructed.
560 Bit 1 → RWE Renewal of the stage E registers is instructed.
561 → RNE Renewed register numbers of stage E.

Where the output signal of the selector 570 is RNx1 and that of the selector 571, RNx2:

$$RNx1 = \overline{RB1} \cdot RN1A + RB1 \cdot RN1B$$

$$RNx2 = \overline{RB2} \cdot RN2A + RB2 \cdot RN2B$$

Identity signals of the comparators will be:

Comparator 582, (RNx1=RN1B)→BC1

Comparator 583, (RNx1=RNC)→CC1

Comparator 584, (RNx1=RND)→DC1

Comparator 585, (RNx1=RNE)→EC1

Comparator 586, (RNx2=RN1B)→BC2

Comparator 587, (RNx2=RNC)→CC2

Comparator 588, (RNx2=RND)→DC2

Comparator 589, RNxw=RNE)→EC2

The hit information of an instruction present in the pipes ahead of an executional instruction when the latter is going to shift from stage A to stage B is expressed in the following manner:

$$BH1 = BC1 \cdot RWB \cdot \overline{RB1} \cdot \overline{RB2}*$$

$$CH1 = CC1 \cdot RWC$$

$$DH1 = DC1 \cdot RWD$$

$$EH1 = EC1 \cdot RWE$$

$$BH2 = BC2 \cdot RWB \cdot \overline{RB1} \cdot \overline{RB2}*$$

$$CH2 = CC2 \cdot RWC$$

$$DH2 = DC2 \cdot RWD$$

$$EH2 = EC2 \cdot RWE$$

BH1: The register number of the first operand is identical with a register number to be renewed by an instruction present at stage B.
CH1: The register number of the first operand is identical with a register number to be renewed by an instruction present at stage C.
DH1: The register number of the first operand is identical with a register number to be renewed by an instruction present at stage D.
EH1: The register number of the first operand is identical with a register number to be renewed by an instruction present at stage E.
BH2: The register number of the second operand is identical with a register number to be renewed by an instruction present at stage B.
CH2: The register number of the second operand is identical with a register number to be renewed by an instruction present at stage C.
DH2: The register number of the second operand is identical with a register number to be renewed by an instruction present at stage D.
EH2: The register number of the second operand is identical with a register number to be renewed by an instruction present at stage E.
10*: The logical product of RB1 and RB2 is obtained so that neither BH1 nor BH2 becomes "1" because the instruction itself is waiting at stage B when operand determination awaiting is generated.

Next will be presented the holding conditions of registers, the selection logics of selectors and the setting/resetting conditions of flip-flops.

Renewal command for the register files 10 and 11 = RWE
Renewed numbers of the register files 10 and 11 = RNE
Read-out number of the register files 10 = RN1A
Read-out number of the register file 11 = RN2A
If selection is done in the following combination by the selector 12 with selection signals S00, S01 and S02:

```
S00 S01 S02
000 → 10 (Register file for the first operand)
001 → 38 (Operational result at stage E)
010 → 36 (Operational result at stage D)
011 → 35 (Operational result at stage C)
100 → 32 (Operational result at stage B)
S00 = VP1B · BH1
```

$$S01 = VP1C \cdot \overline{BH1} \cdot CH1 + VP1D \cdot \overline{BH1} \cdot \overline{CH1} \cdot DH1$$

$$S02 = VP1C \cdot \overline{BH1} \cdot CH1 + VP1E \cdot \overline{BH1} \cdot \overline{CH1} \cdot \overline{DH1} \cdot EH1$$

If selection is done in the following combination by the selector 13 with selection signals S10, S11 and S12:

```
S12 S11 S12
000 → 11 (Register file for the second operand)
001 → 38 (Operational result at stage E)
010 → 36 (Operational result at stage D)
011 → 35 (Operational result at stage C)
100 → 32 (Operational result at stage B)
S10 = VP1B · BH2
```

$$S11 = VP1C \cdot \overline{BH2} \cdot CH2 + VP1D \cdot \overline{BH2} \cdot \overline{CH2} \cdot DH2$$

$$S12 = VP1C \cdot \overline{BH2} \cdot CH2 + VP1E \cdot \overline{BH2} \cdot \overline{CH2} \cdot \overline{DH2} \cdot EH2$$

The hold logic of the resister 31 being represented by H0:

$$H0 = \overline{RB1 \cdot RB2}$$

The hold logic of the register 34 being represented by H1:

$$H1 = RB1 \cdot \overline{RB2}$$

The hold signals of the registers 35, 36 and 37 are always "0".
The selection signal of the selector 38 being represented by S20.
S20
    0→301 (First processing pipe)
    1→311 (Second processing pipe)
S20 = $\overline{VP1E}$
The hold signals of the registers 520, 521, 522, 530, 531 and 534 being represented by H2:

$$H2 = RB1 + RB2$$

The setting signal of the F/F 580, indicating the state of awaiting the determination of the first operand, being represent by ST1,
The resetting signal of the F/F 580, indicating the state of awaiting the determination of the first operand, being represent by RT1,
The setting signal of the F/F 581, indicating the state of awaiting the determination of the second operand, being represent by ST2,
The resetting signal of the F/F 581, indicating the state of awaiting the determination of the second operand, being represent by RT2:

$$\begin{cases} ST1 = \overline{RB1} \cdot \overline{RB2} \cdot RR1 \cdot (VP1B \cdot BH1 + VP1C \cdot \overline{BH1} \cdot CH1 + \\ \qquad\qquad VP1D \cdot \overline{BH1} \cdot \overline{CH1} \cdot DH1 + \overline{BH1} \cdot \overline{CH1} \cdot \overline{DH1}) \\ RT1 = RB1 \cdot \overline{CH1} \cdot \overline{DH1} \cdot EH1 \end{cases}$$

$$\begin{cases} ST2 = \overline{RB1} \cdot \overline{RB2} \cdot RR2 \cdot (VP1B \cdot BH2 + VP1C \cdot \overline{BH2} \cdot CH2 + \\ \qquad\qquad VP1D \cdot \overline{BH2} \cdot \overline{CH2} \cdot DH2 + \overline{BH2} \cdot \overline{CH2} \cdot \overline{DH2}) \\ RT2 = RB2 \cdot CH2 \cdot DH2 \cdot EH2 \end{cases}$$

The hold signals of the registers 540, 541, 550, 551, 560 and 561 are always "0".

Figure 4:
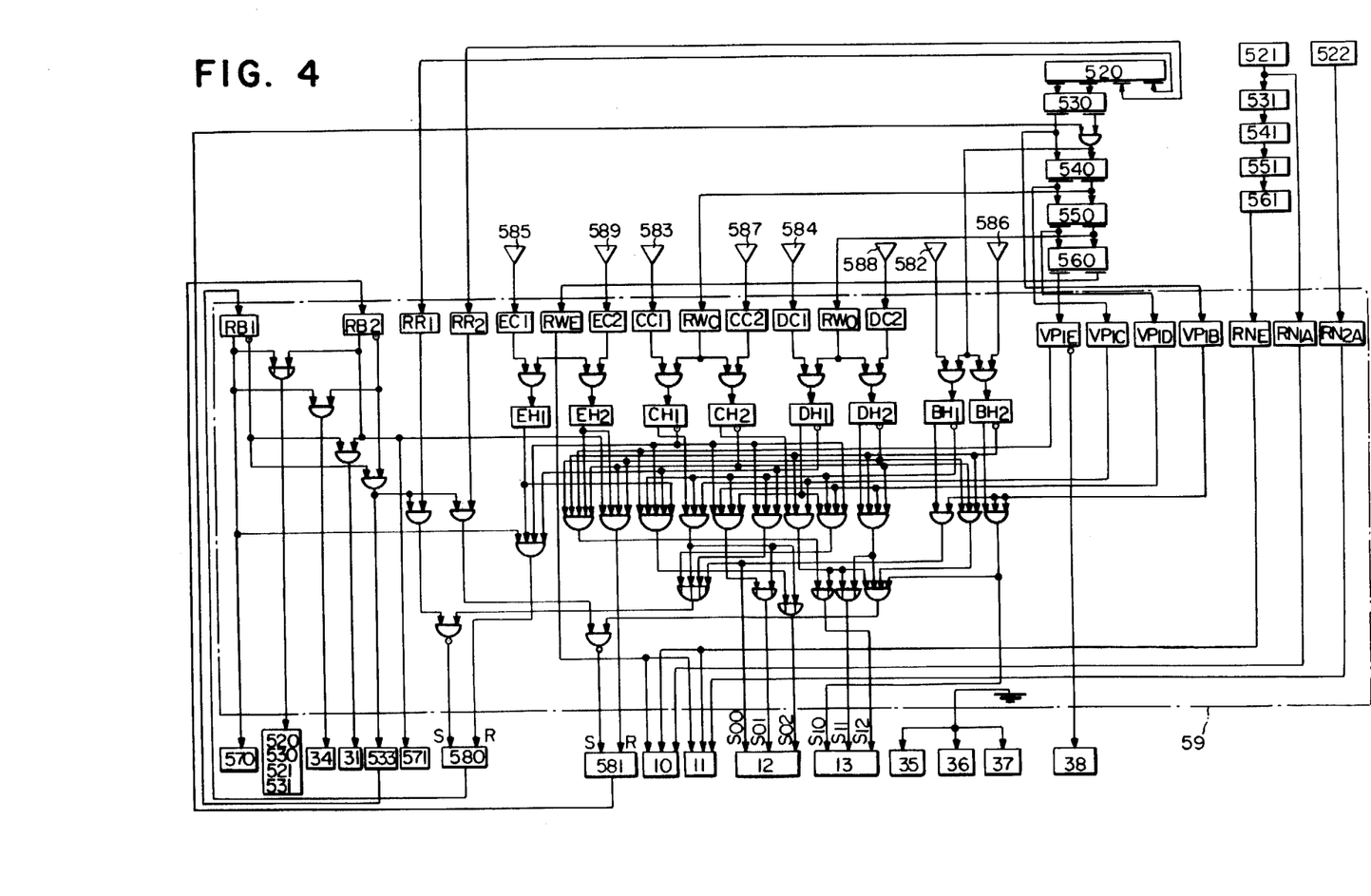
FIG. 4 illustrates the detailed structure of the logic circuit 59 in FIG. 3.
Figure 5:
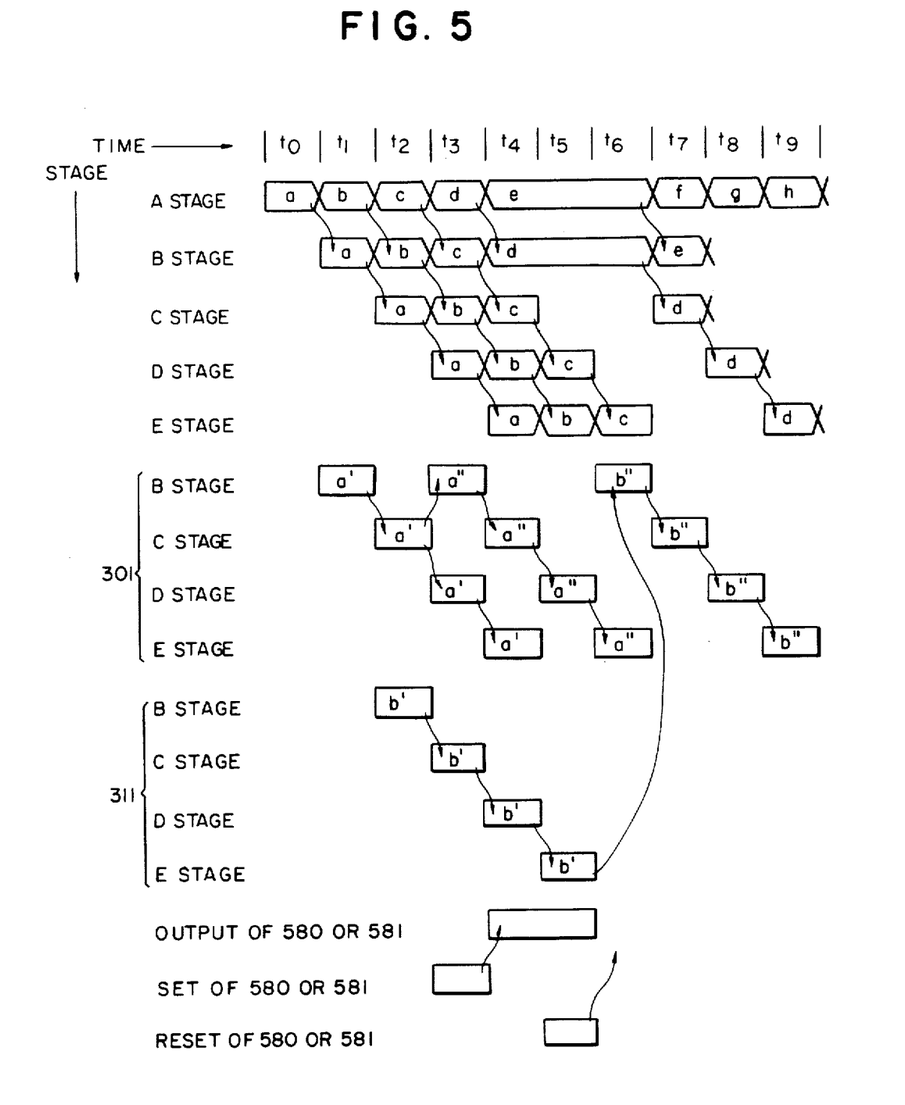
FIG. 5 is a time chart showing the relationship between the structures illustrated in FIGS. 2 and 3.

FIG. 5 is a time chart illustrating the movements of data shown in FIGS. 2, 3 and 4. In this figure which focusses on the first or second operand, it is supposed that a sequence of instructions a, b, c, d, e, f, g and h are given in that order from an external unit. The operand of the instruction a is represented by a', for which the first processing pipe 301 is used, and the operand of the instruction b is represented by b', for which the second processing pipe 311 is used. The operational result of the instruction a is used as the operand for instruction c, and that of the instruction b, as the operand for instruction d.

The instructions a, b and c are successively executed from stage A on. The operand to be used by the instruction c when this instruction is going to shift from stage A to stage B is present at stage C of the first processing pipe 301.

Since this operand (operational result of the instruction a) permits bypassing, it is bypassed at stage A, and the instruction c is executed without delay. In FIG. 5, the operational result a' of this bypassed instruction a is shown as operand a".

Then, the operand to be used by the instruction d when this instruction is going to shift from stage A to stage B is present at stage C of the second processing pipe 311. Since this operand (data being processed at the instruction b) does not permit bypassing, it sets the F/F 580 or 581 indicating the state of waiting for operand determination, and the instruction d awaits operand determination at stage B. Operational data b' of the instruction b of the second processing pipe 311 proceeds to stages D and E. Upon determination of the operational result, the data supplies operands to the instruction d which is awaiting operand determination at stage B, and at the same time reset the F/F 580 and 581 indicating the state of waiting for operand determination. The instruction d, receiving operational result b' of the instruction b, resumes the execution of operation.

The present invention has the benefit of accomplishing effective operation by performing bypass control and determination-awaiting control of operands for mutiple processing pipes arranged in parallel.

What is claimed is:
1. A processor for executing operations in a pipeline system, comprising:
    a plurality of operand registers, each identified by a register number;

a pipelined arithmetic unit having inputs and a plurality of operational stages;

a plurality of data buses connected between outputs of said operational stages of said arithmetic unit and said inputs of said arithmetic unit, said data buses transferring operand inputs to said arithmetic unit;

a selector for selecting either an output from said plurality of operand registers or said outputs of said operational stages as operand inputs to the arithmetic unit;

a generator for generating an operand determination signal indicating that an output from said plurality of operational stages of the arithmetic unit has been determined as write-in data for an operand register corresponding to a stage of the arithmetic unit;

a circuit for transmitting and circulating a register number given for said operand register whose renewal is specified by a given instruction and a command to renew the operand register corresponding to said stage of the arithmetic unit; and a control circuit responsive to at least said register number and said operand determination signal for controlling said selector so as to select at least one of said operand registers when at least one operand for the instruction is held in said at least one operand register, to select said arithmetic unit when said operand for the instruction has already been determined in said arithmetic unit, and to select said arithmetic unit after said operand for the instruction has been determined unless said operand for the instruction is determined, so that said operand for the instruction is supplied to the arithmetic unit.

* * * * *